Feb. 13, 1968   W. H. LUEHRMANN ET AL   3,369,217
METHOD AND APPARATUS FOR GENERATING
AN UNDERWATER ACOUSTIC IMPULSE
Filed Sept. 26, 1966
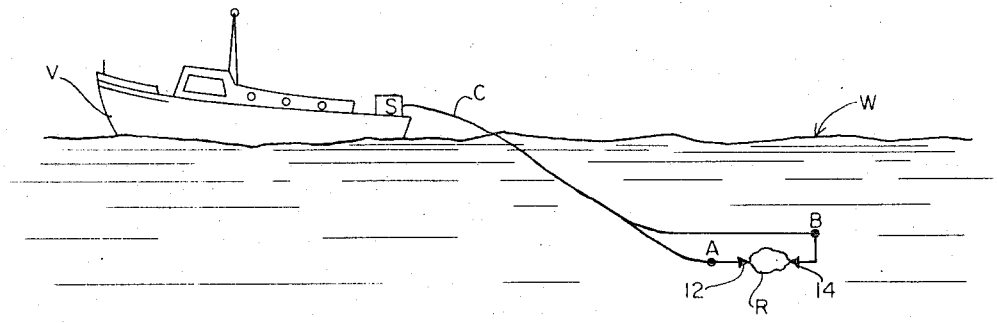
Fig.1
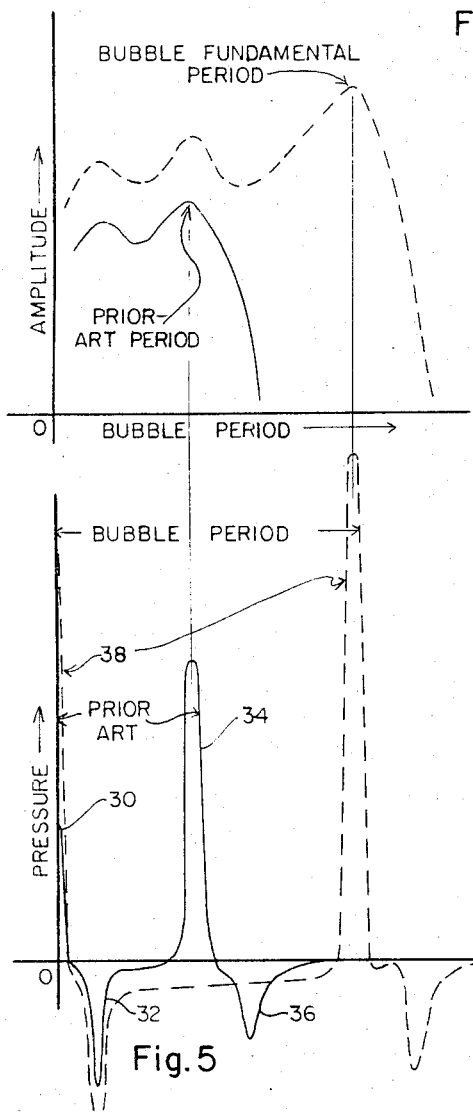
Fig.5
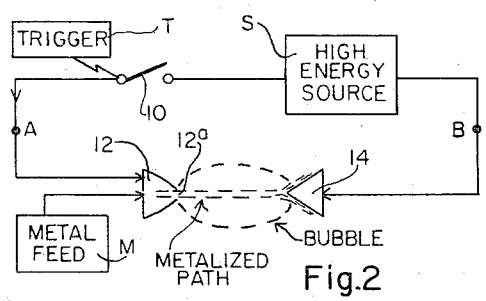
Fig.2
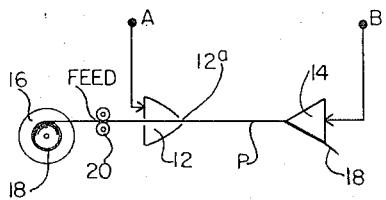
Fig.3
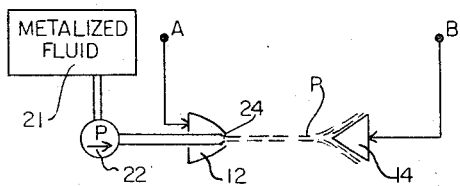
Fig.4
INVENTOR
WILLIAM H. LUEHRMANN
CARL O. BERGLUND
WILLIAM H. PARKER
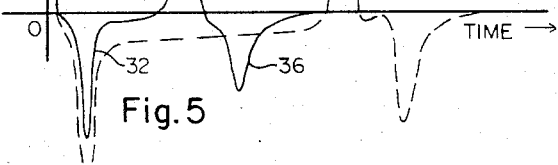
ATTORNEYS

United States Patent Office 3,369,217
Patented Feb. 13, 1968

3,369,217
METHOD AND APPARATUS FOR GENERATING AN UNDERWATER ACOUSTIC IMPULSE
William H. Luehrmann, Carl O. Berglund, and William H. Parker, Dallas, Tex., assignors to Teledyne Industries, Inc., Geotech Division, a corporation of California
Filed Sept. 26, 1966, Ser. No. 581,982
4 Claims. (Cl. 340—7)

ABSTRACT OF THE DISCLOSURE

Method and apparatus for improving a seismic source by increasing the efficiency of conversion of electrical energy discharged between immersed electrodes from a given storage device into subaqueous seismic disturbances for the purpose of lowering the frequency of the resulting fundamental component of the disturbance by virtue of an increase in the size and duration of the resulting plasma bubble. The improved lower frequency content of the disturbance provides deeper penetration into subaqueous strata, and is the direct result of metallizing a small cross-section path between the electrodes prior to each discharge, and then discharging sufficient electrical energy therethrough to vaporize the path, the discharge persisting beyond the time required for such vaporization.

---

This invention relates to improvements in methods and apparatus for generating underwater acoustical impulses, and more particularly relates to improved methods and apparatus for increasing the generated acoustical energy while decreasing the fundamental frequency thereof, especially in the type of seismic survey equipment employing a high-energy electrical discharge through the water to set up a plasma bubble therein.

The prior art has suggested a number of different basic approaches to the problem of providing underwater seismic impulses, including explosions, magnetostrictive disturbances, electrical discharge disturbances, etc. It is to the latter type of approach that the improvements of the present invention are directed. The electrical discharge usually is from a source of stored electrical energy which can be discharged suddenly between two electrode means immersed in the water, and usually towed behind a vessel. The current from the source is introduced at one of the electrodes, passes through and ionizes the water in a region between the electrodes, and is returned to the source through another electrode which is usually located relatively close to the first electrode. In most cases the electrode separation at said region does not exceed several feet. The source of stored energy is advantageously of the capacitive type which is triggered by suitable means to apply great energy across the electrodes. The passage through the water of this energy ionizes the water in said region and creates conductive ions whose character depends upon the available constituents in the water, for instance $Cl_2$. A large steam bubble is formed by the heat generated at the plasma discharge in the region between the electrodes and the bubble is sustained beyond the interval of time that the discharge current is passing therethrough, depending upon the time required to dissipate the heat in the bubble region. The size of the bubble and its rate of change determine the content of the acoustical shock wave, and in turn this size depends upon the amount of electrical energy per unit time that can be passed through the interelectrode region. Moreover, the duration of the bubble is the major contributing factor in the determination of the fundamental frequency of the seismic shock wave. The lower the frequency the better the penetration into bottom formations, and therefore it is desirable to create as large a bubble of as long a time-duration as possible.

The principal obstacle in the way of creating large bubbles of relatively long duration resides in the electrical resistivity of the discharge path, even after plasma is established in the region around the electrodes. The total resistance of the discharge path is the sum of the resistance of the conductors leading to the electrodes plus the resistance of the path between the electrodes. The latter resistance is much greater than the former, which can be controlled by selection of the conductors leading from the electrical energy source to the electrodes. The resistance of the current path in salt water never decreases into the milliohm range, and in practical electrode configurations, where the electrodes are separated by several feet, the resistance is of the order of one ohm or more.

It is the principal object of the present invention to reduce this resistance of the path between electrodes while at the same time maintaining substantial electrode spacings for the purpose of obtaining large bubble sizes and maintaining spacings between electrodes sufficient to reduce erosion thereof. Significant reduction of the resistance between electrodes results in much higher peak current. Greater discharge current has the effect of significantly increasing the source efficiency, i.e., the percent of electrical energy transformed into acoustical energy. Since substantial electrode spacings can be maintained with the present technique, and since a longer bubble time also results, a much higher-pressure acoustical impulse containing a lower fundamental frequency is generated in the water. This greater energy is particularly useful for the purpose of obtaining seismic reflection data from geological beds located, for instance, several miles below the water bottom.

The improvement of the present novel technique involves the introduction of conductive particles or metallic wire into the region between the electrodes so that when the stored electrical energy is passed through this region, the metal will vaporize and provide an increased concentration of ions in the plasma region to significantly reduce its resistance. For example, using a 25,000 joule source, bubble times of 30 to 35 milliseconds duration are typical, and this duration is approximately twice as long as is obtained using prior-art techniques without the addition of conductive ions to the plasma region. The present invention is described in terms of a practical embodiment using a metallized path, although the term "metallized" as used herein is intended to also include non-metallic conductive path materials. The present technique employs a repeating cycle wherein, after each discharge through the plasma region, the metallized path is replaced prior to the next discharge and during the interval of time when geophone arrays are receiving reflection data. For instance, the discharge of a new impulse may take place at intervals of four to six seconds, and between successive discharges the metallized path must be replaced in preparation for the next "shot."

Other objects and advantages of the present improved method and apparatus will become apparent during the following discussion of the drawing, wherein:

FIG. 1 is a pictorial view showing a vessel towing apparatus for generating an underwater acoustic impulse by an electrical discharge through the water;

FIG. 2 is a block diagram schematically illustrating a suitable system according to the present invention;

FIG. 3 is a diagram illustrating apparatus for feeding metal wire into the region between electrodes;

FIG. 4 is a diagram illustrating apparatus for injecting a metallized fluid between electrodes; and FIG. 5 is a graphical showing of the improvement accomplished by the technique of the present invention.

Referring now to the drawing, FIG. 1 shows a vessel V moving to the left through a body of water W, the vessel carrying on board a source S of electrical energy connected by a cable C to the terminals of two electrodes, the terminals being labeled respectively A and B. The vessel V can also carry on board seismograph recording equipment connected by another cable to a suitable geophone streamer (the latter equipment not being illustrated in the present drawing). Alternatively, such a geophone array can be towed behind a different vessel, all of these techniques being well known in the prior art and forming no part of the present invention which relates only to the generation of acoustical impulses in the water.

FIG. 2 shows the electrical source S connected through a suitable trigger T which operates to close, in effect, a switch 10 to deliver the electrical energy from the source S directly across the electrode terminals A and B and between the electrodes 12 and 14, respectively. For instance, assume that the charge is delivered as a unidirectional pulse to the electrode 12 and that the electrode 14 functions as a return path. It is also convenient to assume that the electrode 12 is towed through the water ahead of the electrode 14 so that the metal which is fed from the electrode 12 will be carried in the direction of the electrode 14 by the forward motion provided by the vessel V. There are a number of different ways of metallizing paths between these electrodes. These various means are broadly represented by the illustrated metal feed means M which feeds into the electrode 12 having a guiding means 12a at its right end.

As illustrated in FIG. 3, this metal feed means M can comprise a drum 16 onto which wire 18 is wound, the wire being pulled from the drum and driven through the guide 12a by any suitable means, schematically represented by feed rollers 20. The means by which the wire is driven through the guide 12a in the direction of the electrode 14 can be controlled either automatically or manually by means (not shown). The term "wire" refers to any filar or ribbon shaped material having good conductivity, for instance copper. Only a short length of wire need be fed across the region R between the electrodes, just enough to make contact with the electrode 14 before the trigger T is actuated to initiate the next "shot." When the shot occurs, the wire 18 will vaporize in the region between the electrodes 12 and 14, and when the source S has expended all of its energy through the region the trigger switch 10 will be rendered non-conductive again, and there will be a waiting interval before the next shot during which the geophone array will receive reflections resulting from the acoustical impulse provided by the bubble in the region R, and during which interval more wire 18 will be fed from the drum 16 through the electrode guide 12a and into contact with the electrode 14.

FIG. 4 shows another type of path metallizing means in which a metallized fluid, or liquid such as liquid solder or copper sulfate, is pumped from a tank 21 through a pump 22, and is discharged in the direction of the electrode 14 through a nozzle 24 which is directed toward the electrode 14 from the electrode 12. Just prior to each closing of the trigger switch 10, a stream of metallized fluid from the tank 21 is jetted from the electrode 12 toward and around the electrode 14, and the impulse of electrical energy is then applied across the terminals A and B while this metallized fluid is still forming a metallic path to the electrode 14. The discharge of electrical energy through the path P will cause the latter to ionize, and thereby provide a great concentration of highly conductive ions within the region between the two electrodes, thereby reducing the resistance of this region and permitting the flow of energy at a high level therethrough.

Referring now to FIG. 5, this figure shows two columnized graphs representing the pressure wave forms and the bubble spectrum plotted in period form providing a comparison between the acoustical energy applied to the water in the region between the electrodes using a prior art plasma source which does not introduce a metallized path through the inter-electrode region, and for the present inventive source which does employ a metallized path in the region between the electrodes. The figure further shows that the fundamental period has been significantly increased using the metallized path technique. This illustrates that greater low frequency acoustical energy is generated when employing this technique. The pressure curves were measured by a pressure detector located one meter from the acoustical impulse region between the electrodes. A mathematical analysis of these pressure curves provides the bubble period shown in the upper curves of FIG. 5. The solid-line curve shows the prior art discharge having characteristics as follows: An initial positive pressure pulse due to the formation of the bubble is shown at 30. This pulse is followed by a reflection from the water surface as shown at 32, followed by the collapse or implosion of the bubble as shown at 34, and followed by its reflection from the water surface shown at 36. The dashed-line curve 38 shows the pressure waveform of the bubble resulting from the introduction of a metallized path in the region between electrodes prior to discharge of the same energy source through the water between the electrodes. It will be noted that the observed pressure waveform of the bubble resulting from the pulse 38 is not only greater in amplitude, but it is also important to note that the width of the impulse waveform 38 is twice as wide as that of the impulse 30–34 and that the area under the larger impulses is very much greater, this area representing total energy.

This invention is not to be limited to the exact forms shown in the drawing, for obviously changes can be made therein within the scope of the following claims.

We claim:
1. The method of generating in water an improved seismic disturbance the fundamental frequency of which is extended to a lower frequency by establishing a larger steam bubble within a region between immersed electrodes, including the steps of: introducing a path of metallic material between said electrodes, discharging at least 25,000 joules of electrical energy between said electrodes and through said path, and proportioning the energy discharged and the material and initial resistance of the metallic path such that the discharged energy vaporizes the path material early in the discharge and the discharge persists substantially beyond said vaporization.

2. The method of generating in water an improved arc-discharge disturbance the fundamental frequency of which is lowered as a result of establishing a larger plasma bubble based on a given energy discharged between spaced electrodes, including the steps of: introducing between said electrodes a path of conductive material of cross-sectional area which is small as compared with the length of the path, discharging electrical energy through the path between said electrodes at an energy level sufficient to vaporize the material in the path, and maintaining the energy discharge for a time which is long as compared with the time required to vaporize said path material.

3. The method of generating a series of successive underwater seismic shots between electrodes, including the steps of: towing the electrodes through the water spaced in the direction of towing; metallizing a path by introducing conductive material at the leading electrode extending toward and to the trailing electrode; vaporizing the metallized path by discharging electrical energy therethrough sufficient to initially vaporize the path, and then maintaining the discharge substantially beyond said initial vaporization; similarly metallizing another path extending from the leading to the trailing electrode, and vaporizing the newly metallized path by again discharging a like amount of electrical energy therethrough.

4. The method of generating time-spaced underwater seismic disturbances, the fundamental frequency of each of which is lowered as a result of generating a larger bubble, including the steps of metallizing a path through the water; vaporizing the metallized path by discharging electrical energy therethrough to form metal ions; maintaining the flow of electrical energy through the path for an interval substantially exceeding the time required to vaporize the path and sufficient to form a superheated steam bubble persisting for at least thirty milliseconds; and repeating the above sequence of steps.

References Cited

UNITED STATES PATENTS

| | | | |
|---|---|---|---|
| 2,907,416 | 10/1959 | Comba et al. | 189—26 |
| 3,163,732 | 12/1964 | Abbott et al. | 200—116 |
| 3,251,027 | 5/1966 | Huckabay et al. | 340—7 X |
| 3,332,510 | 7/1967 | Clark | 181—.5 |

OTHER REFERENCES

Martin, E. A.: Experimental Investigation of a High-Energy Density, High-Pressure Arc Plasma in Journal of Applied Physics, vol. 31, No. 2, pp. 255–267, February 1960.

Early, H. C. and Martin, E. A.: The Underwater Spark in Communications and Electronics, No. 22, pp. 788–790, January 1956.

BENJAMIN A. BORCHELT, *Primary Examiner*.

P. A. SHANLEY, R. M. SKOLNIK, *Assistant Examiners*.